United States Patent [19]

Oneda

[11] Patent Number: 5,111,194
[45] Date of Patent: May 5, 1992

[54] ARTIFICIAL HALFTONE PROCESSING APPARATUS

[75] Inventor: Shogo Oneda, Yokohama, Japan

[73] Assignee: Ricoh Company, Ltd., Japan

[21] Appl. No.: 479,618

[22] Filed: Feb. 12, 1990

[30] Foreign Application Priority Data

Feb. 16, 1989 [JP] Japan .................................. 1-37236
Jul. 28, 1989 [JP] Japan .................................. 1-195619
Dec. 16, 1989 [JP] Japan .................................. 1-326724

[51] Int. Cl.⁵ .............................................. E09G 3/00
[52] U.S. Cl. ..................................... 340/793; 358/456
[58] Field of Search ....................... 340/793, 799, 767;
358/429, 455, 456, 457, 458, 459, 460, 451;
382/50, 53

[56] References Cited

U.S. PATENT DOCUMENTS

| | | | |
|---|---|---|---|
| 3,781,846 | 12/1973 | Eichelberger et al. | 340/799 |
| 4,760,463 | 7/1988 | Nonoyama et al. | 358/455 |
| 4,782,400 | 11/1988 | Ohtani | 358/429 |
| 4,786,976 | 11/1988 | Takao et al. | 358/456 |
| 4,847,809 | 7/1989 | Suzuki | 340/799 |
| 4,866,534 | 9/1989 | Tada | 358/456 |
| 4,905,294 | 2/1990 | Sugiura | 392/53 |
| 4,987,498 | 1/1991 | Shimazaki | 358/456 |

*Primary Examiner*—Alvin E. Oberley
*Assistant Examiner*—Xiao Min Wu
*Attorney, Agent, or Firm*—Mason, Fenwick & Lawrence

[57] ABSTRACT

An artificial halftone processing apparatus for binarizing input image information on the basis of the densities of pixels and combining a plurality of sets of resultant binary data to produce multi-level tone information. A matrix for halftone processing is variable in size or arrangement to store a plurality of pixel data in a memory together. Halftone processing is executed in an optimal manner for a particular kind of figure to be drawn.

18 Claims, 10 Drawing Sheets

Fig. 3A

|     | 0 | 1 | 2 | 3 |
|-----|----|----|----|----|
| 0 | 63 | 48 | 44 | 60 |
| 1 | 40 | 16 | 12 | 36 |
| 2 | 20 | 4  | 8  | 32 |
| 3 | 52 | 24 | 28 | 56 |

Fig. 3B

|   | 0 | 1 | 2 | 3 | 4 | 5 | 6 | 7 |
|---|---|---|---|---|---|---|---|---|
| 0 | 58 | 53 | 39 | 28 | 27 | 42 | 54 | 59 |
| 1 | 48 | 40 | 21 | 14 | 13 | 20 | 41 | 49 |
| 2 | 34 | 22 | 10 | 4  | 3  | 9  | 19 | 35 |
| 3 | 29 | 15 | 5  | 1  | 2  | 8  | 18 | 32 |
| 4 | 38 | 23 | 11 | 6  | 7  | 12 | 26 | 37 |
| 5 | 52 | 45 | 24 | 16 | 17 | 25 | 44 | 51 |
| 6 | 62 | 56 | 46 | 30 | 31 | 43 | 55 | 61 |
| 7 | 63 | 57 | 47 | 33 | 36 | 50 | 60 | 63 |

Fig. 3C

|   | 0 | 1 | 2 | 3 | 4 | 5 | 6 |
|---|---|---|---|---|---|---|---|
| 0 | 60 | 56 | 40 | 38 | 54 | 59 | 63 |
| 1 | 42 | 30 | 14 | 6  | 12 | 28 | 52 |
| 2 | 32 | 22 | 8  | 2  | 4  | 20 | 36 |
| 3 | 44 | 24 | 16 | 10 | 18 | 26 | 50 |
| 4 | 61 | 57 | 46 | 34 | 48 | 58 | 62 |

ARTIFICIAL HALFTONE PROCESSING APPARATUS

BACKGROUND OF THE INVENTION

The present invention relates to an artifical halftone processing apparatus and, more particularly, to an artificial halftone processing apparatus of the type binarizing input image information on the basis of the densities of pixels and combining a pluality of sets of resultant binary data to produce multi-level tone information.

With a laser printer or similar recorder, only a predetermined recording density is available for all the pixels so that density is rendered in two levels only, i.e. black and white. It has been customary, therefore, to provide this kind of recorder with an implementation for rendering halftone artificially which relies on dither processing. Dither processing is such that the number of recording pixels and that of non-recording pixels are adjusted in each of multiple regions each consisting of a plurality of output pixels so as to increase or decrease the average tone of each region, thereby rendering halftone. Adjusting the number of recording pixels and that of non-recording pixels on an $8 \times 8$ matrix region basis, for example, is successful in rendering sixty-five consecutive tones. For this kind of processing, use is made of a threshold table in which a different threshold value is assigned to each pixel position of a matrix having a predetermined number of pixels. The tones of the individual pixels of input image information are compared one-to-one with the threshold values of the threshold table, so that output pixels are provided with either a recording level or a non-recording level on the basis of the result of comparison. Some laser printers or similar recorders have a hardward dither processing device capable of executing halftone processing at high speed in order to implement the dither processing.

A dilemmatic situation with artificial halftone processing described above is that increasing the size of the matrix for halftone processing allows delicate tones to be rendered, but it lowers the resolution of an image. Further, when a figure or similar image is equal to or greater in size than the matrix, critical errors occur in the representation of tones of an output figure resulting in the image quality being noticeably degraded. On the other hand, when the size of the matrix is reduced, the number of tones which can be renderd is reduced to in turn aggravate the tone errors of an output image, again resulting in poor image quality. The dither processing device installed in the prior art recorder has a dither matrix whose size and configuration are fixed and generates information representative of pixel positions in the matrix by using a counter which counts scan synchronizing signals synchronous to recording operations. Hence, when a figure constituting an image is relatively small, the tones of an output image are poor; when the matrix is small, tones cannot be rendered delicately with the result that the tone errors of an output image are aggravated. Furthermore, assume that image data undergone halftone processing are written in a memory instead of being delivered to a printer or similar output unit, and that the image data have been dither-processed with respect to two levels. Then, since addresses of a memory are usually assigned on an eight bit (one byte) basis, eight pixels of data have to be stored together.

The various problems discussed above will be eliminated if the halftone matrix is adjustable in size in matching relation to the size of a figure, i.e., if delicate tone representation is availble with relatively large figures and the tone representation errors and the decrease in resolution particular to relatively small figures are minimized. This kind of processing is complicated and cannot be executed unless all the halftone processing is implemented by software. In image processing, however, since the number pixels to be processed is huge, executing the whole halftone processing pixel by pixel by software would required an extremely long period time.

SUMMARY OF THE INVENTION

It is therefore an object of the present invention to provide an artifical halftone processing apparatus having a halftone matrix which is variable in size and configuration and capable of completing halftone processing within a short period of time.

It is another object of the present invention to provide an artificial halftone processing apparatus having a halftone matrix which is variable in size and configuration and capable of writing a plurality of pixel data in a memory together and executing halftone processing within a short period of time.

It is another object of the present invention to provide a generally improved artificial halftone processing apparatus.

In accordance with the present invention, an artificial halftone processing apparatus for processing and rendering a halftone image artifically comprises an image outputting unit having two-dimensional addresses each being assigned to respective one of pixels which constitute a two-dimensional image, a pulse generating unit for generating pulses having a predetermined period, an address generating unit for generating the two-dimensional addresses of the image outputting unit, the address generating unit comprising at least one counter for counting the pulses generated by the pulse generating unit, a halftone processing unit for outputting, by using a haftone processing table in which a different threshold value is assigned to each pixel position in a set two-dimensional pixel matrix region, a signal produced by reducing a tone level of an input multi-level tone signal to the image outputting unit, an address information converting unit for converting two-dimensional address information generated by the address generating unit into two-dimensional position information representative of a pixel position in the two-dimensional pixel matrix of the halftone processing unit, and feeding the position information to the halftone processing unit, and a matrix updating unit for updating the arrangement or the size of the two-dimensional pixel matrix region and updating a content of conversion by the address information converting unit.

Also, in accordance with the present invention, an artifical halftone processing apparatus for processing and rendering a halftone image artificially comprises an image outputting unit having addresses each being assigned to a plurality of pixels which constitute a two-dimensional image together with other pixels and have individual two-dimensional addresses, a pulse generating unit for generating pulses having a predetermined period, an address generating unit for generating, by using at least one counter for counting the pulse generated by the pulse generating unit, the two-dimensional addresses of the image outputting unit, a serial-to-parallel converting unit for storing, by using a register capable of holding a plurality of pixel data, holding input pixel data by switching positions in response to the two-dimensional addresses outputted by the address generating unit, and outputting a plurality of pixel data to the image outputting unit in parallel, a halftone processing unit for outputting, by using a halftone processing table in which a different threshold value is assigned to each pixel position in a set two-dimensional pixel matrix region, a signal produced by reducing a tone level of an input multi-level tone signal to the serial-to-parallel converting unit, an address information converting unit for converting two-dimensional address information generated by the address generating unit into two-dimensional pisition information representative of a pixel position in the two-dimensional pixel maxrix of the halftone processing unit, and feeding the position information to the halftone processing unit, and a matrix updating unit for updating the arrangement or size of the two-dimensional pixel matrix region and updating a content of conversion by the address information converting unit.

BRIEF DESCRIPTION OF THE DRAWINGS

The above and other objects, features and advantages of the present invention will become more apparent from the following detailed description taken with the accompanying drawings in which:

FIGS. 3A and 3C show examples of two-dimensional threshold table;

DESCRIPTION OF THE PREFERRED EMBODIMENTS

Figure 1:
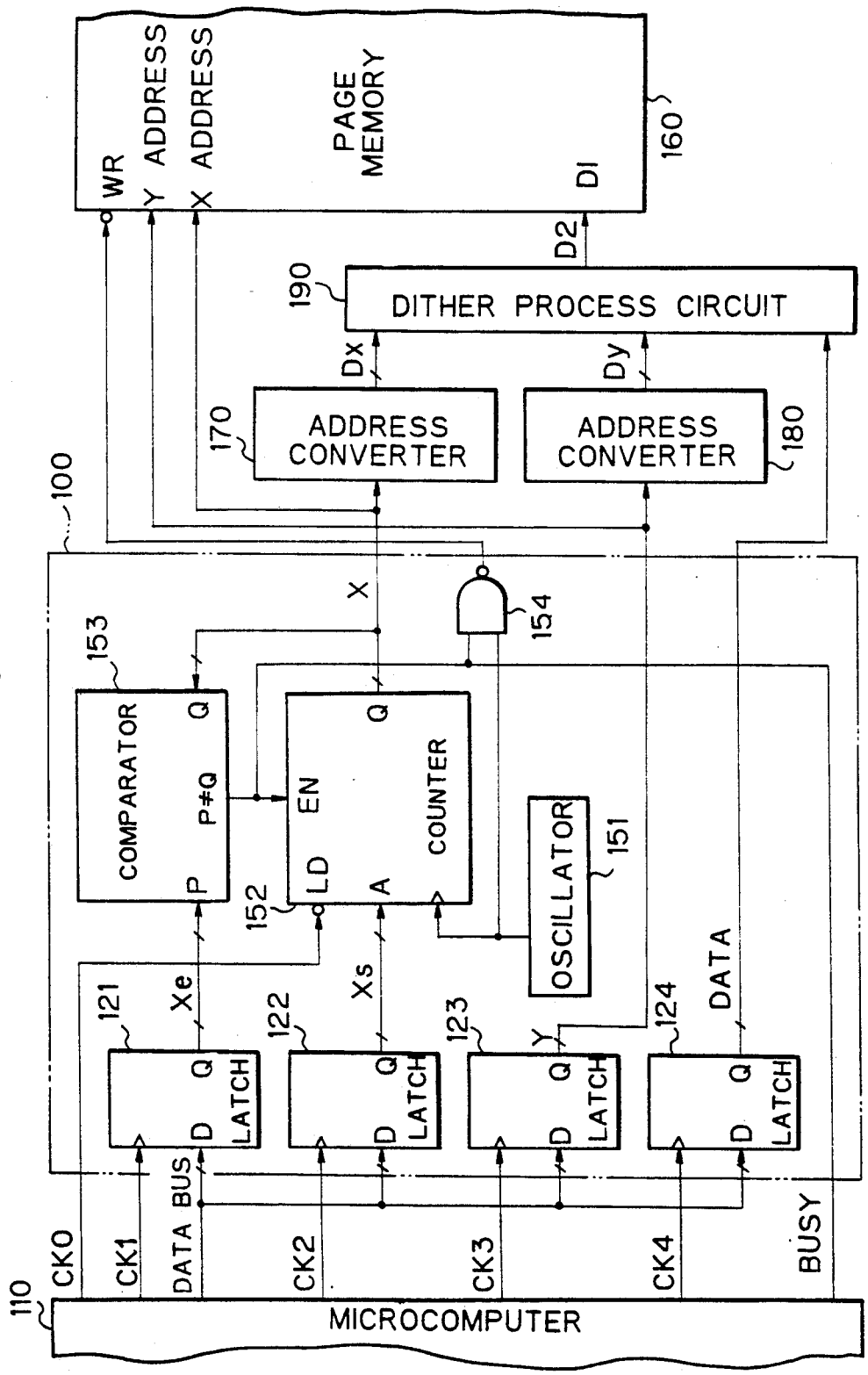
FIG. 1 is a schematic block diagram showing an artificial haltone processing apparatus embodying the present invention.
Figure 4:
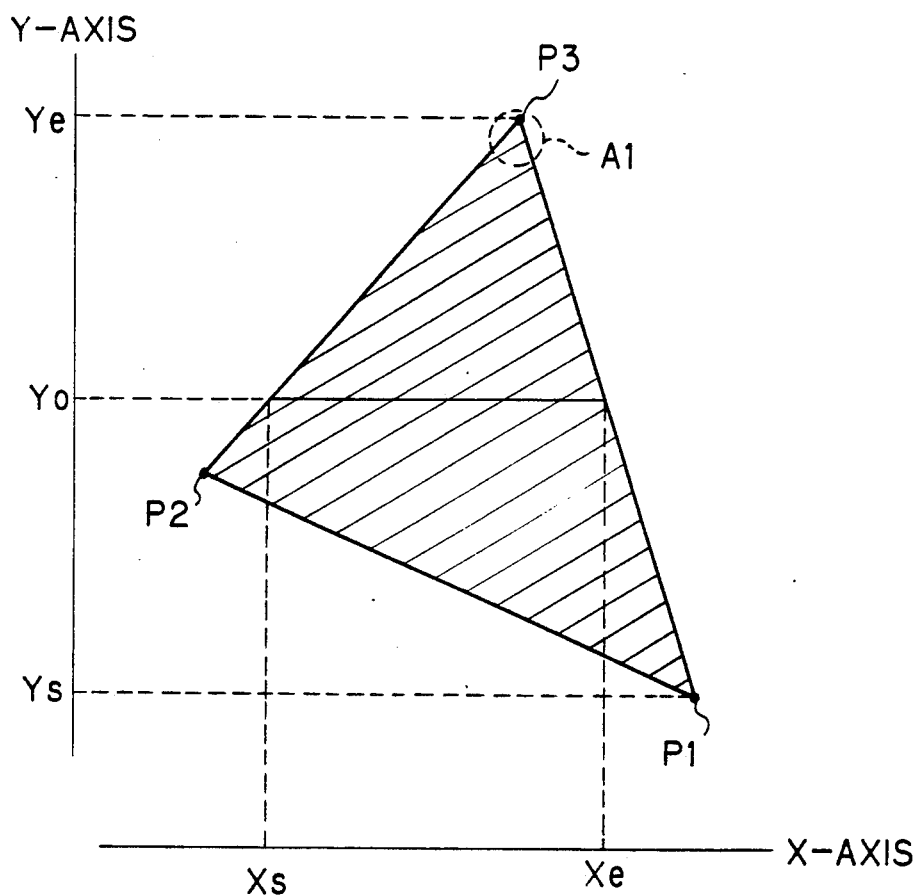
FIG. 4 is a diagram useful for understanding a procedure for converting image data into information represented by a group of two-dimensional pixels.

Referring to FIG. 1 of the drawings, an artificial halftone processing apparatus embodying the present invention is shown. As shown, the device has a page memory 160 in which one page of two-dimensionally arranged pixel data are supervised with a different address being assigned to each plurality of pixels. Processed image information is written and stored in the page memory 160 as a two-dimensional image. The page memory 160 has an X address terminal and a Y address terminal for designating X coodinate and Y coordinate of a pixel, respectively. Further, the page memory 160 has a write strobe terminal WR and a data input/output terminal DI. A microcomputer 110 is connected to a keyboard, disk memory or similar input unit. When a predetermined command is entered on the input unit, the microcomputer 110 writes image data in the two-dimensional storage area of the page memory 160 on the basis of entered image information. In the illustrative embodiment, the image information is entered in the form of a code and, assuming a triangle as shown in FIG. 4, includes the coordinates of three points P1, P2 and P3 and a value representative of the density or the color of the figure. The transformation of the coded image information to two-dimensional pixel group as shown in FIG. 4 is implemented by the software of the microcomputer 110 and the other hardware circuits shown in FIG. 1.

Figure 5:
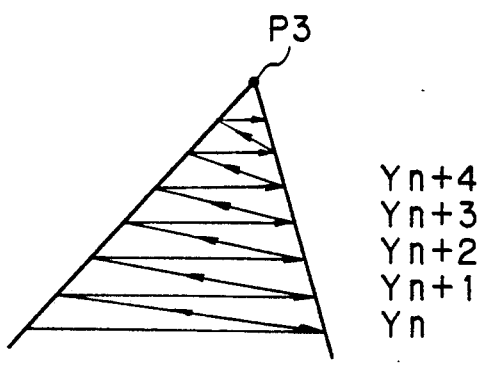
FIG. 5 is a fragmentary enlarged view of the diamgram of FIG. 4.

In FIG. 4, the hatched area is the area to be painted. FIG. 5 shows part A1 of the triangle of FIG. 4 in an enlarged scale. The triangular pattern of FIG. 4 may be rendered by a number of straight lines which extend along the X axis, for example. Specifically, such a pattern may be drawn by selecting any desired Y coordinate Yo between the lowermost Y coordinate Ys and uppermost Y coordinate Ye of the triangle, determining X coordinates Xs and Xe of the boundary between the triangle and the adjoining area at the Y coordinate Yo, drawing a line which connects the coordinates Xs and Xe, and then repeating these steps with all the Y coordinates lying between the coordinates Ys and Ye in the order indicated by arrows in FIG. 5.

In the illustrative embodiment, the microcomputer 110 produces the X coordinate (Xs) of the start point, X coordinate (Xe) of the end point, and the Y coordinate (Y) of each of the number of lines which form a two-dimensional figure as stated above. An address generating circuit 100 and the other electric circuits intervene between the microcomputer 110 and the page memory 160. These electric circuits sequentially generate by hardware processing the address information of the individual pixels which form the lines interconnecting the start points and end points, and they write in those addresses data D2 which have been produced by binarizing density data DATA by dither processing.

As shown in FIG. 1, the microcomputer 110 has a data bus to which four latches 121, 122, 123 and 124 are connected. The latches 121, 122,, 123 and 124 hold respectively the end point coordinate Xe, start point coordinate Xs, Y coordinate Y, and density data DATA which are outputted by the microcomputer 110. The end point coordinate Xe from the microcomputer 110 is latched by the latch 121 and then applied to an input terminal P of a comparator 153. The start point coordinate Xs from the microcomputer 110 is latched by the latch 122 and then fed to a preset data input terminal A of a counter 152. The counter 152 preset the data arrived at the data input terminal A and then counts clock pulses which are outputted by an oscillator 151 while delivering the counts to an output terminal Q. Since the present value of the counter 152 is Xs, the value appearing on its output terminal Q sequentially changes as XS, Xs+1, Xs+2, Xs+3, Xs+4 and so on. This value X is applied to an X address terminal of the page memory 160 and, at the same time, to an input terminal Q of the comparator 153.

The comparator 153 compares the values arrived at its two input terminals P and Q. While the values on the terminals P and Q do not compare equal, the comparator 153 renders an output terminal P≠Q thereof active (H). As aoon as the value on the terminal Q equals the value on the terminal P, i.e., when the address of the generated X coordinate reaches the end point coordinate Xe, the comparator 153 turns the output terminal P≠Q to a low level (L) to show that one line of operation has ended. A signal appearing on the terminal P≠Q of the comparator 153 is fed to an enable input terminal EN of the counter 152. Hence, when the signal of the terminal P≠Q goes low, the counter 152 is disabled. More specifically, the counter 152 is incremented up to Xe. A gate 154 has two input terminals to which are respectively applied the signal appearing on the terminal P≠Q of the comparator 153 and the clock pulses being generated by the oscillator 151. On the output terminal of the gate 154, therefore, a signal whose level is opposite to the level of the clock pulses appears when the terminal P≠Q of the comparator 153 is in a high level, i.e., when the counter 152 is in operation. More specifically, every time the X address is updated as counted by the counter 152, one clock pulse is fed to the write strobe input terminal WE of the page memory 160.

When the signal BUSY on the terminal P≠Q of the comparator 153 is L (meaning that the counter 152 is out of operation), the microcomputer 110 generates one pulse CK0. This pulse is applied to a data load input terminal LD of the counter 152, whereby the counter 152 presets the input data Xs. As the counter 152 presets the data Xs, the value Xs appears on its output terminal Q while the value Xe appears on the terminal P of the comparator 153. Then, the result of comparison is negative so that the signal appearing on the terminal P≠Q of the comparator 153 turns from L to H. In this condition, the counter 152 is enabled and, therefore, sequentially outputs the addresses Xs to Xe. At the same time, the gate 154 produces write pulses. It follows that every time the pulse CK0 is generated, the addresses of a group of pixels constituting a single line at the Y position of the Y coordinate and from the Xs position to the Xe position of the X coodinate are sequentially applied to the page memory 160. The data D2 are sequentially written in such addresses of the page memory 160 in synchronism with the write pulses which are fed from the gate 154 to the page memory 160. Consequently, a single segment is drawn in the page memory 160 every time the pulse CK0 appears.

The X coordinate value X from the counter 152 and the Y coordinate value Y from the latch 123 are delivered to address converters 170 and 180, respectively. The address converter 170 transforms the X coordinate value X into an X coordinate position Dx of a dither matrix adapted for halftone processing, while the address counter 180 transforms the Y coordinate value Y into a Y coordinate position Dy of the dither matrix. The values Dx and Dy are equal to the quotient of X/Sx and the quotient of Y/Sy, respectively, where Sx and Sy denote respectively the numbers of pixels in the X and Y directions of the dither matrix of a dither processing circuit 190. Assuming that Sx is 4, for example, Dx is sequentially changed as 0, 1, 2, 3, 0, 1, 2, 3, 0 and 1 as X sequentially changes as 0, 1, 2, 3, 4, 5, 6, 7, 8 and 9. If Sy is 5, then Dy is sequentially changed as 0, 1, 2, 3, 4, 0, 1, 2, 3 and 4 as Y changes as 0, 1, 2, 3, 4, 5, 6, 7, 8 and 9.

Figure 2:
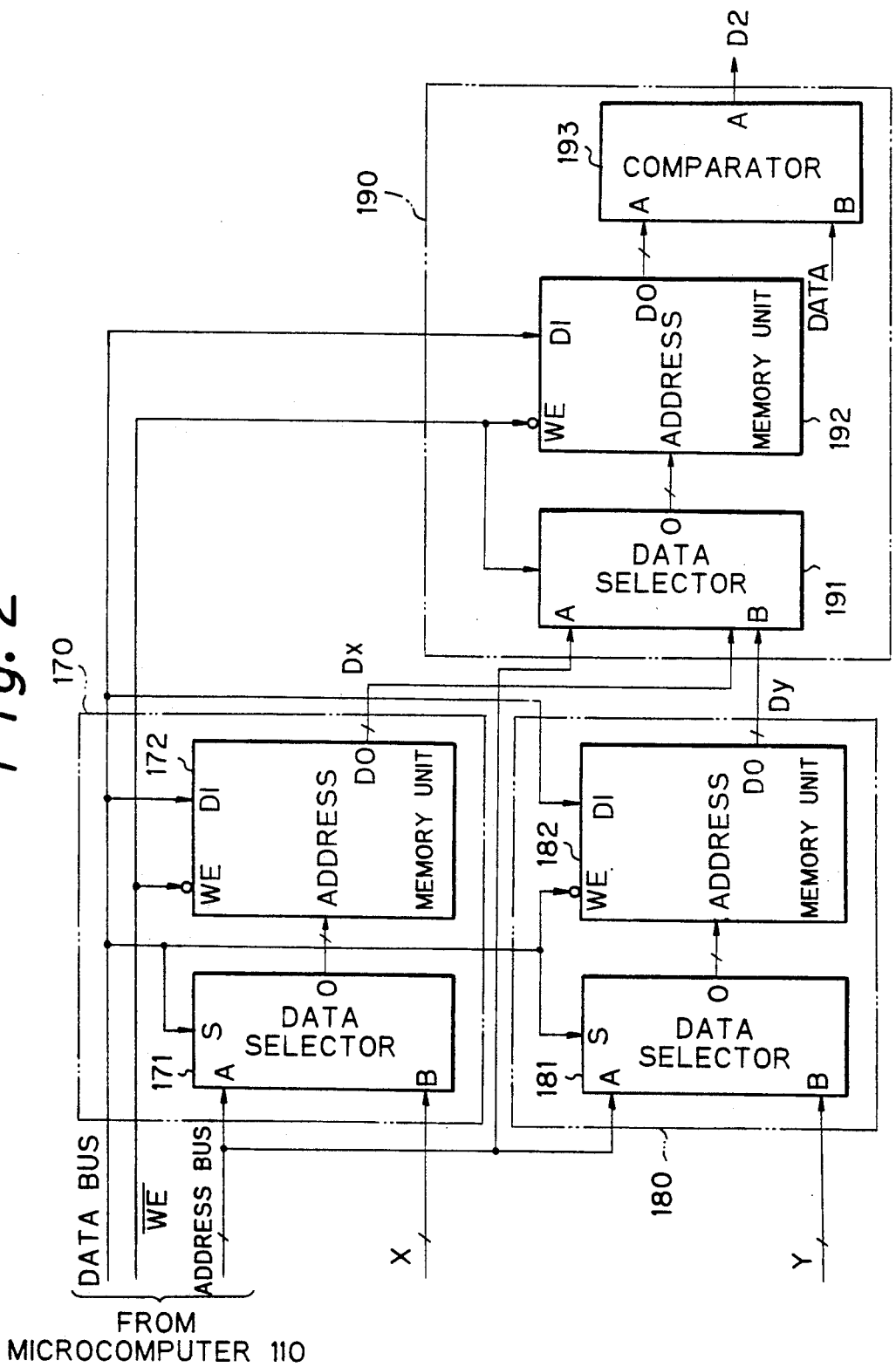
FIG. 2 is a block diagram schematically showing specific constructions of two address converters and a dither processing circuit included in the apparatus of FIG. 1.

Referring to FIG. 2, specific constructions of the two address converters 170 and 180 are dither processing circuit 190 are shown. As shown, the address converter 170 has a memory unit 172 serving as a conversion table, and a data selector (multiplexer) 171 connected to an address terminal of the memory unit 172. Likewise, the address converter 180 has a memory unit 182 and a data selector 181. The dither processing circuit 190 has a data selector 191, a memory unit 192 functioning as a threshold table, and a comparator 193. The microcomputer 110 writes in the memory unit 192 a two-dimensional threshold table in any suitable matrix such as shown in FIG. 3A, 3B or 3C. In the example shown in FIG. 3B, the matrix has eight pixels in each of the X and Y directions, and a different threshold value ranging from 0 to 63 is assigned to each pixel position. In this case, both of Dx and Dy range from 0 to 7.

The data selector 191 usually selects an input terminal B thereof. Hence, Dx and Dy from the address converters 170 and 180, respectively, are applied to the address terminal of the memory unit 192 and designate addresses which correspond to the positions on the matrix. The threshold value of the designated address is fed from an output terminal DO of the memory unit 182 to an input terminal A of the comparator 193. The comparator 193 compares the value arrived at the input terminal A with six-bit (sixty-four tones) density data DATA which is applied to the input terminal B. If the value on the terminal A is smaller than the density data DATA, the comparator 193 produces a ONE (H) on a terminal B>A; if otherwise, it produces a ZERO (L). Despite that D2 is binary data which is either a ONE or a ZERO, halftone can be rendered artificially because the threshold differs from one pixel to another in the matrix, as shown in any of FIGS. 3A to 3C. That is, the number of recording pixels and that of non-recording pixels included in the output pixels delicately change in association with the tone of the input density DATA, whereby the average density of output pixels is changed in a single matrix.

In the specific construction shown in FIG. 190, the threshold table of the dither processing circuit 190 is implemented by the read/write memory unit 192 and connected to the microcomputer 110. The microcomputer 110 is, therefore, capable of altering the content of the threshold table as needed. More specifically, the data bus of the microcomputer 110 is connected to a data input terminal DI of the memory unit 192. When the microcomputer 110 renders the write strobe WE active (L), the data selector 191 brings the address bus of the microcomputer 110 into connection with the address terminal of the memory unit 192. In this condition, the microcomputer 110 is allowed to write data directly in the memory unit 192. The memory unit 192 has twelve-bit addresses each being capable of accommodating six-bit data. The memory unit 192, therefore, can be used as a threshold table having a 64×64 pixels microcomputer 110 construction. The microcomputer 110 can construct a threshold table having any suitable size and configuration such as shown in any one of FIGS. 3A to 3C, as desired. It is to be noted that a change in the size of the threshold table, for example, causes the correspondence of the coordinates of output pixels and the coordinates in the dither matrix to change and, therefore, the contents of conversion by the address converters 170 and 180 should be changed also.

In the light of the above, the conversion tables of the address converters 170 and 180 are implemented as the read/write memory units 172 and 182, respectively, and are connected to the microcomputer 110. Specifically, the data bus of the microcomputer 110 is connected to the data input terminals DI of the memory units 172 and 182. When the microcomputer 110 renders the write strobe WE active, the data selectors 171 and 181 connect the data bus to the address terminals of the memory units 172 and 182. In this condition, the microcomputer 110 may write data directly in the memory units 172 and 182, as needed.

Figure 6A:
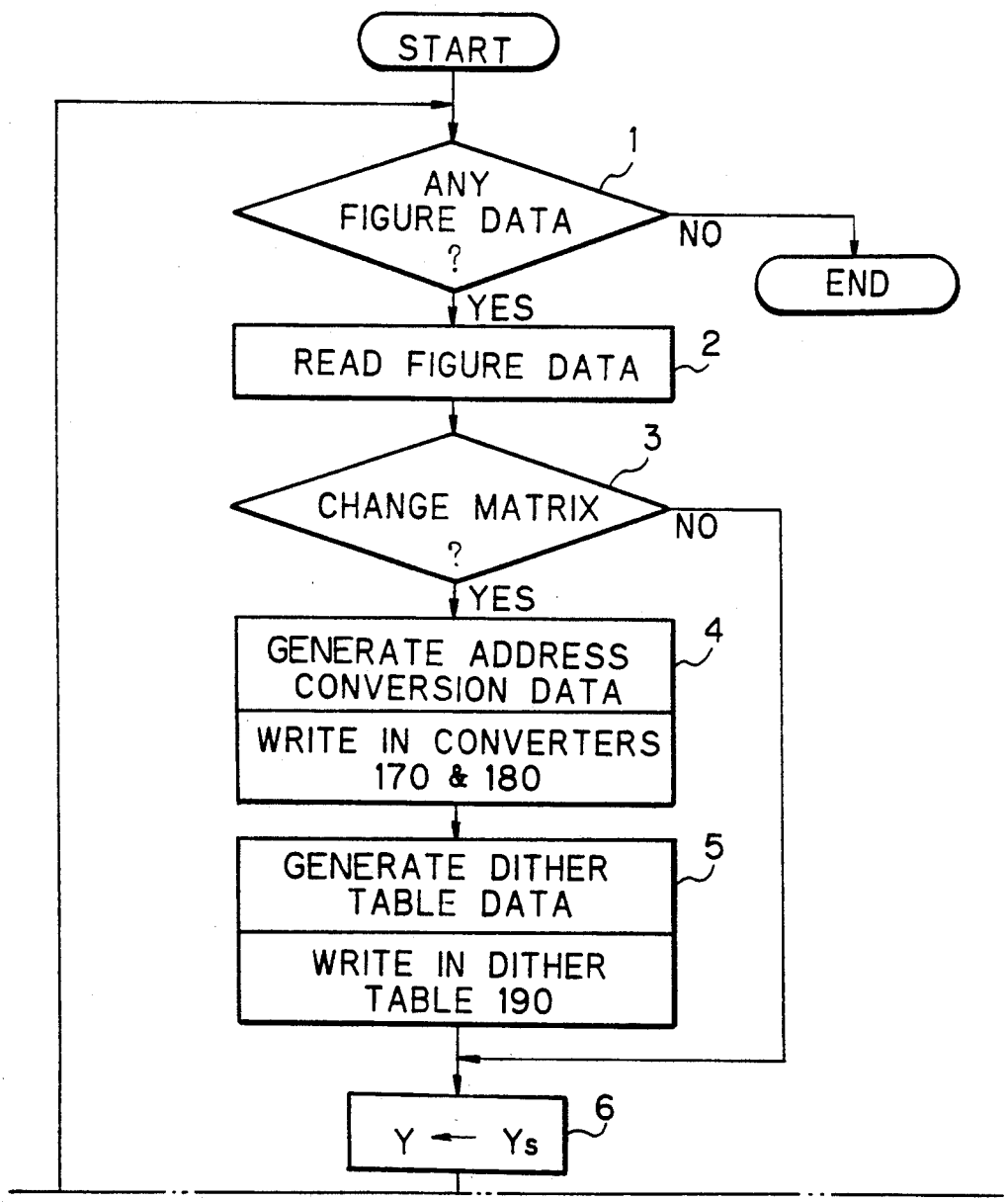
FIGS. 6A-6B are flowcharts demonstrating the general operation of a microcomputer.
Figure 6B:
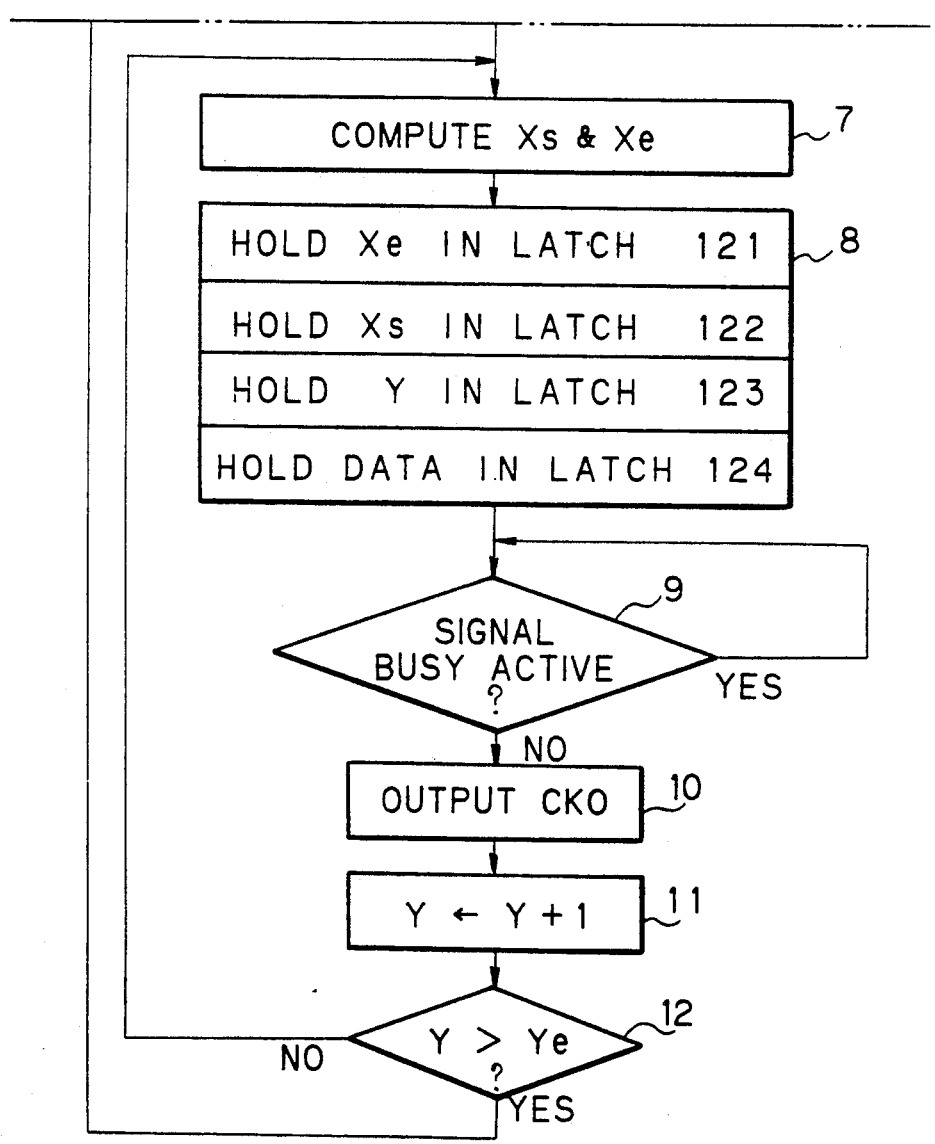

FIGS. 6A–6B are flowcharts demonstrating the general operation of the microcomputer 110. As shown, the microcomputer determines whether or not information representative of a desired figure exists in its internal memory (step 1). If the answer of the step S1 is YES, a step 2 is executed for reading a set of graphic data. Assuming the triangle shown in FIG. 4, for example, the microcomputer reads a code indicative of the kind of the figure, coordinates of the three apexes P1, P2 and P3, density DATA, and values Sx and Sy representative of the size of a matrix selected for tone processing. If the answer of the step 1 is NO, the processing is ended. In a step 3, the microcomputer 110 determines whether or not the conversion tables for halftone processing have been set up. If such tables have been set up for the first time or if the sizes Sx and Sy of the matrix have been changed, the program executes a step 4 because a matrix for dither processing has to be set up; if otherwise, the program jumps to a step 6. In the step S4, the microcomputer 110 computes the contents of conversion by the address converters (quotients of X/Sx and Y/Sy) with all the necessary X's and Y's and writes the results of computation in the memory units 172 and 182 to thereby update the conversion tables. In a step 5, the microcomputer 110 comprises the content of the threshold table of the dither processing circuit 190 on the basis of the altered Sx and Sy and writes the result in the memory unit 192 to update the threshold table.

In a step 6, the microcomputer 110 stores the smallest Y coordinate value Ys residing in the range of the desired figure in a Y coordinate register which is adapted to draw a segment. In the case of the triangle shown in FIG. 4, for example, the smallest Y coordinate value Ys is the Y coordinate value of the apex P1. In a step 7, the microcomputer determines the X coordinates of two points where the horizontal line (parallel to the X axis) having the Y coordinate stored in the register (Ys at first) and the segments of the triangle intersect each other. Smaller one of the resulting two X coordinates is determined to be the start point coordinate Xs, while the other or larger one is determined to be the end point coordinate Xe. In a step 8, the microcomputer 110 delivers the end point coordinate Xe to the data bus while feeding a pulse CK1 to cause the latch 121 to hold it, then delivers the start point coordinate Xs to the data bus while feeding a pulse CK2 to cause the latch 122 to hold it, and then delivers the Y coordinate stored in the register in the step 3 to the data bus while feeding a pulse CK3 to cause the latch 123 to hold it. Thereafter, the microcomputer 110 delivers the density data DATA to the data bus while outputting a pulse CK4 to cause the latch 124 to hold it.

If the signal BUSY is not active as determined in step 9, the program advances to a step 10; if otherwise, the inquiry is repeated until the signal BUSY becomes inactive. In the step 10, the microcomputer 110 outputs a single pulse on its output CK0. At the trailing edge of this pulse, the start point coordinate Xs is loaded (preset) in the counter 152 and, as a result, the counter 152 begins to operate. In a step 11, the Y coordinate stored in the register is incremented (+1). The resulting content of the register, i.e., whether or not the Y coordinate has exceeded the greatest Y coordinate value Ye existing in the range of the figure is determined in a step 12.

If Y is greater than Ye, the microcomputer 110 determines that the figure has been entirely written. If Y is not greater than Ye, the program returns to the step 7 for determining the start point Xs and end point Xe of a line associated with the updated Y coordinate and for drawing that line. Such a procedure is repeated until Y becomes greater than Ye. When Y becomes greater than Ye, i.e., one figure has been entirely drawn, the program returns to the step 1 to search for data representative of another figure. So long as the same matrix as before is used for dither processing, the steps 4 and 5 are skipped. If the matrix has to be changed, the steps 4 and 5 are executed to rewrite the tables of the address converters 170 and 180.

It will be seen that the illustrative embodiment is capable of drawing a plurality of figures having been dither-processed by various sizes of matrices on a single page of output image. Since the addresses in the X direction are generated at a high speed by the counter 152 and since the X coordinates Dx of the matrix for dither processing are also generated at high speed by the converter 170, the period of time necessary for figure drawing inclusive of dither processing is extremely short.

A prerequisite with the illustrative embodiment is that the operation of the microcomputer 110 and that of the address generating circuit 100 be synchronous to each other. If the period of time necessary for the microcomputer 110 to compute the coordinates of one segment is shorter than the period of time necessary for the address generating circuit 100 to draw one segment, the microcomputer 110 has to wait until the signal BUSY becomes active, i.e., until the preceding segment has been fully drawn. Conversely, if the former is longer than the latter, the address generating circuit 100 having drawn one segment has to wait until the microcomputer 110 determines the coordinates of the next segment. Such a waiting time slows down the drawing operation.

Figure 7:
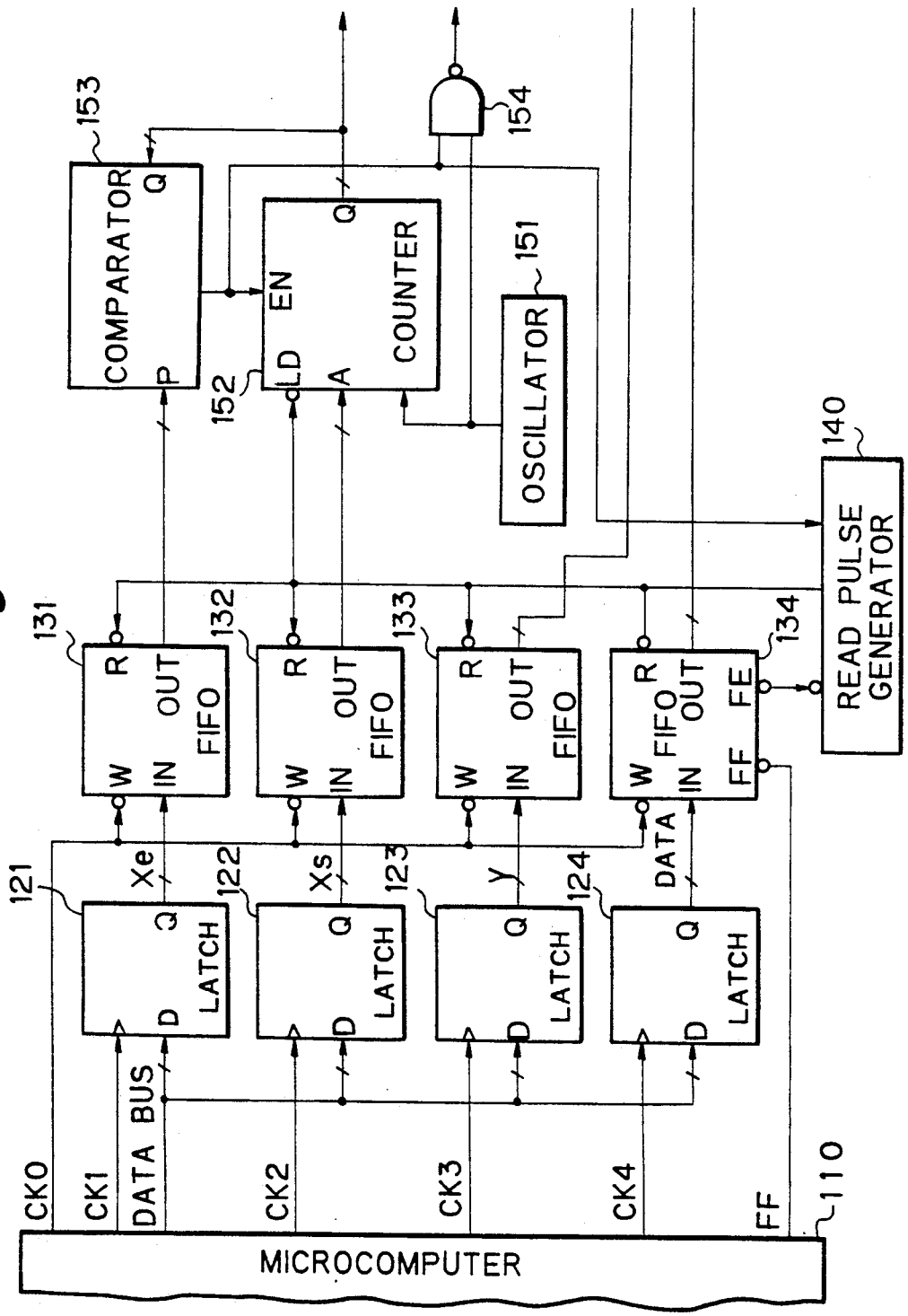
FIG. 7 is a schematic block diagram showing another specific construction of the address generating circuit.

Referring to FIG. 7, another specific construction of the address generating circuit is shown which is constructed and arranged to reduce the above-discussed waiting time. As shown, the address generating circuit has four FIFO (First-in First-Out) memories 131, 132, 133 and 134, and a read pulse generator 140. In this particular embodiment, all the four memories 131 to 134 have the same storage capacity, and each is provided with a data input terminal IN, a write strobe input terminal W, a data output terminal OUT, a read strobe input terminal R, a full flag output terminal FF, and an empty flag output terminal FE. The outputs Xe, Xs, Y and DATA of the latches 121, 122, 123 and 124 are applied to the data input terminals IN of the FIFO memories 131, 132, 133 and 134, respectively. Each of the memories 131 to 134 is capable of accommodating N groups of data at a time and, on accommodating N groups of data, renders its full flag output terminal FF active (L). When all the N groups of data are read out of the FIFO memory, its empty flag output terminal FE becomes active (L). The end point coordinate Xe outputted by the microcomputer 110 is held by the latch 121, then written in the memory 131, then read out, and then applied to the input terminal P of the comparator 153. Likewise, the start point coordinate Xs outputted by the microcomputer 110 is held by the latch 122, then written in the memory 132, then read out, and then applied to the reset data input terminal A of the counter 152.

A pulse generator, not shown, is built in the read pulse generator 140 and generates a pulse if the signal appearing on the terminal P≠Q of the comparator 153 is low level (meaning that the counter is out of operation) when the empty flag output terminal FE of the FIFO memory 134 is in a high level (meaning that data exists in the memory). This pulse is fed to the read strobe input terminals R of the FIFO memories 131 to 134 and the data load input terminal LD of the counter 152. Every time the read pulse gnerator 140 produces a pulse, the FIFO memories 131 to 34 produce leading ones of the data Xe, Xs, Y and DATA which they hold on the output terminals while, at the same time, the counter 152 presets the data Xs applied thereto.

When the counter 152 presets the data Xs, the value Xs appears on its output terminal W while a value Xe appears on the terminal P of the comparator 153, i.e., the result of comparison of P and Q is negative. Then, the signal on the terminal P≠Q of the comparator 153 turns from L to H to enable the counter 152. In response, the counter 152 sequentially produces the addresses Xs to Xe while, at the same time, the gate 154 produces write pulses. The Y coordinate value Y from the FIFO memory 133 an the density data DATA from the FIFO memory 134 are respectively fed to the Y address input terminal and the data input terminal of the page memory 160.

Hence, every time the read pulse generator 140 generates one pulse, the addresses of a group of pixels constituting one line which has the Y coordinate value Y and extends between the X coordinate positions Xs and Xe are sequentially applied to the page memory 160. The density data DATA are sequentially written in such addresses in synchronism with the write pulses which are fed from the gate 154. More specifically, one segment is drawn in the page memory 160 every time the read pulse generator 140 produces one pulse, i.e., a line drawing operation occurs at the output side of the FIFO memories 131 to 134 with no regard to the operation timing of the microcomputer 110 (i.e. asynchronously) so long as data exist in those memories. On the other hand, the microcomputer 110 is capable of continuously computing the coordinates Xs and Xe, for example, with no regard to the line drawing operation of the counter 152 and other hardware circuits so long as the FIFO memories 131 to 134 are not full. More specifically, in this specific construction, the microcomputer 110 references the full flag FF instead of the signal BUSY to see if it is active (step 9, FIG. 6) and, therefore, it can hold the computed coordinates Xs and Xe in the memories 131 and 132 until the FIFO memories 131 to 134 become full. This is successful in eliminating the waiting time, which would bring about wasteful operations as stated earlier, and thereby noticeably cuts down the overall drawing time, compared to the previously stated construction.

Figure 8:
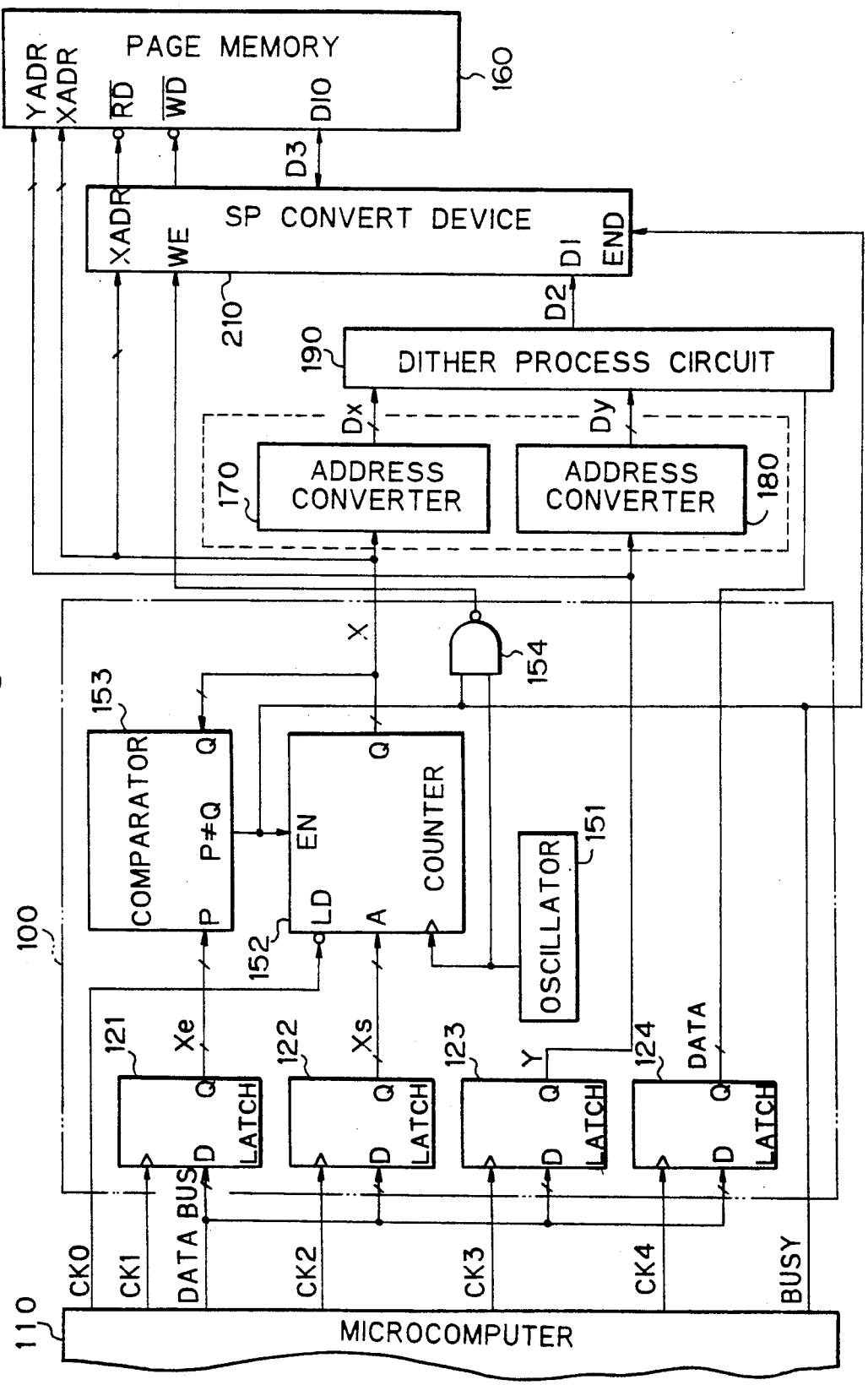
FIG. 8 is a schematic block diagram showing an alternative embodiment of the present invention.
Figure 9:
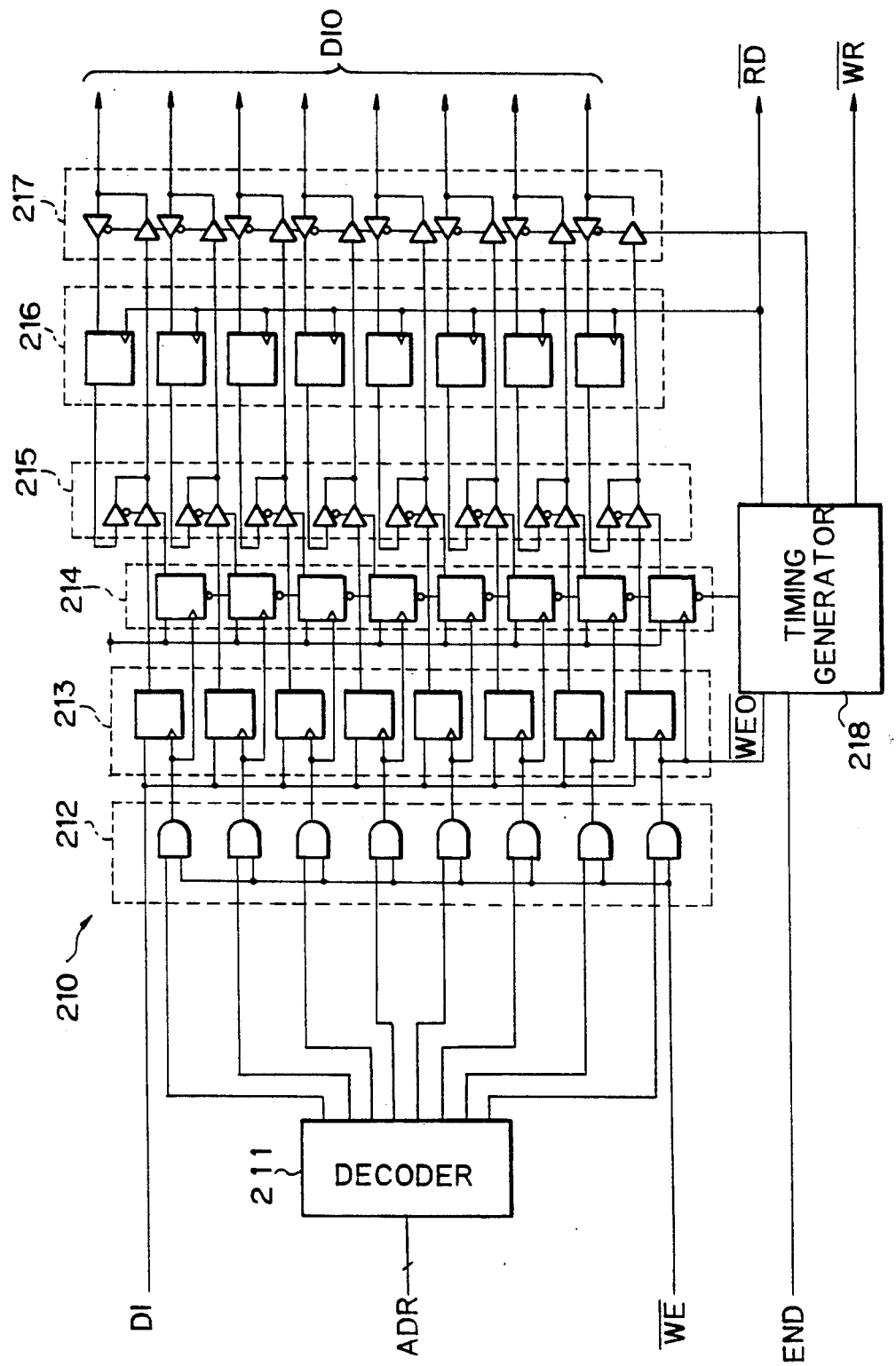
FIG. 9 is a schematic block diagram showing a specific construction of a serial-to-parallel converting device included in the embodiment of FIG. 8.
Figure 10:
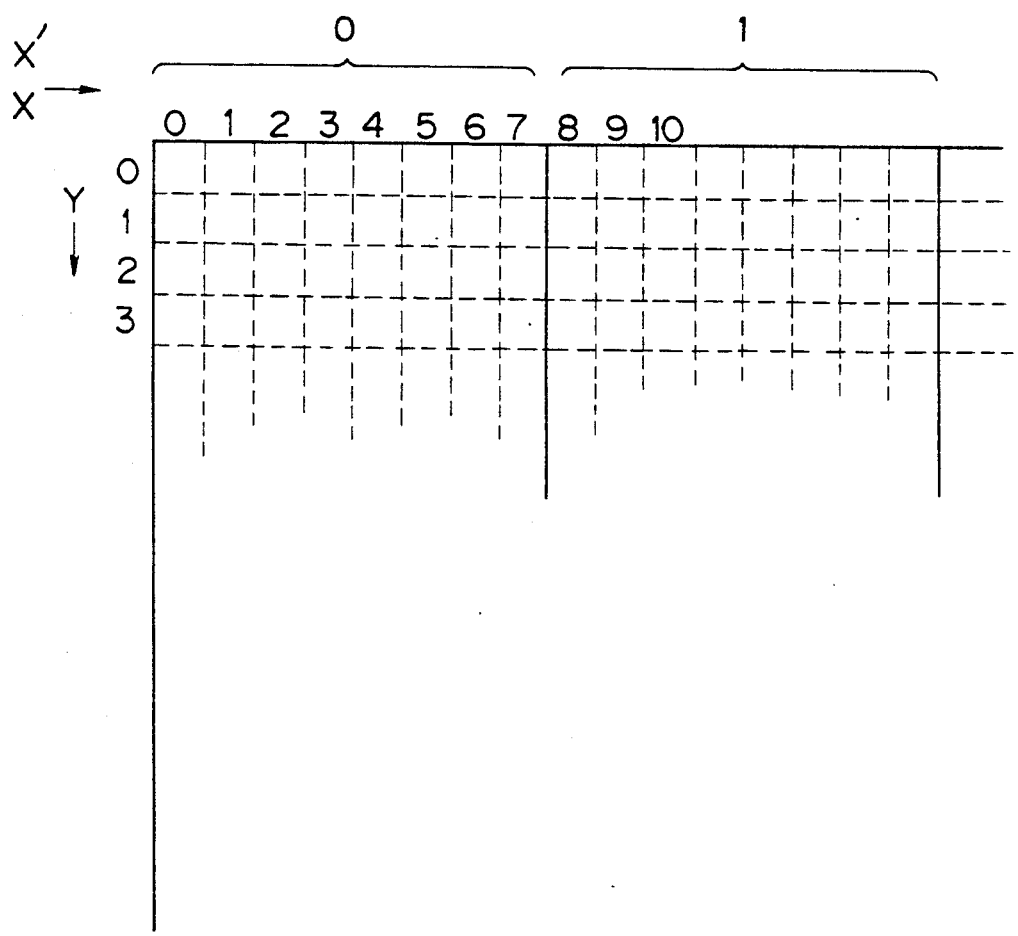
FIG. 10 is a diagram representative of a relationship between X coordinates of pixels and X' coordinates.

Referring to FIGS. 8 and 9, an alternative embodiment of the present invention is shown. In this embodiment, the page memory 160 has an X' address terminal XADR for designating X' coordinates of pixels, a Y address terminal YADR for designating Y coordinates of pixels, a read strobe input terminal RD, a write strobe terminal WR, and a data input/output terminal DIO. Here, the coordinate X' is a coordinate collectively assigned to a plurality of pixels. Assuming that memory addresses are managed on an eight-bit basis, and that one pixel data is represented by one bit, then the coordinate X' is representative of a group of eight pixels and is one-eighth of the coodinates X of the individual pixels, as shown in FIG. 10.

After the counter 152 has preset the data applied to the data input terminal A, it counts the clock pulses fed thereto from the oscillator 151 while delivering the count to the output terminal Q. Since the preset value of the counter 152 is Xs, the value appearing on the output terminal Q of the couner 152 sequentially changes as Xs, Xs+1, Xs+2, Xs+3, Xs+4 and so on. The value X is applied to an X address terminal XADR of a serial-to-parallel (SP) converting device 210 and to the input terminal Q of the comparator 153. The X address except for its lower three bits is applied to the X' address terminal XADR of the page memory 160. The comparator 153 compares the values on the input terminals P and Q. If the two values do not compare equal, the comparator 153 turns the output terminal P≠Q to an active state (H). As soon as P becomes equal to Q, i.e., when the address of the generated X coordinate reaches the end point coordinate Xe, the comparator 153 turns the output terminal P≠Q from H to L to show that one line of operation is completed. The signal appearing on the terminal P≠Q of the comparator 153 is applied to a terminal END of the SP converting device 210. The signal on the terminal P≠Q is also applied to the enable input terminal EN of the counter 152. When this signal goes low, the counter 152 is disabled. Hence, the counter 152 counts up to Xe.

The gate 154 has two input terminals to which are respectively applied the signal appearing on the terminal P≠Q of the comparator 153 and the clock pulses which are generated by the oscillator 151. In this configuration, a signal whose level is opposite to the level of the clock pulses appears on the output terminal of the gate 154 when the terminal P≠Q of the comparator 153 is H, i.e., when the counter 152 is in operation. More specifically, every time the X address is updated as counted by the counter 152, one clock pulse is fed to the write strobe input terminal WE of the SP converting device 210. In response to a write strobe WE, the SP converting device 210 selects a particular storage location of its register depending on the result of X address decoding and stores data therein for a moment. When data associated with the boundary pixel of a pixel group which is collectively supervised in the page memory 160 is written, the SP converting device 210 transfers all the data which it has held to the page memory 160. Also, when one line of processing is completed, the SP converting device 210 transfers all the data which it has held to the page memory 160.

FIG. 9 shows a specific construction of the SP converting device 210. When output data DI is applied to a dither processing circuit in synchronism with a write strobe WE, the SP converting device 210 causes a decoder 211 thereof to decode lower three bits of the X address and feed the result of decoding to a gate group 212 which is adapted to select writing positions. In response, the gate group 212 writes DI in a data register 213. A pulse is applied to the same bit positions of a flag register 214 so as to set flags at the bits where the data have been written.

When a timing generator 218 receives a write pulse WE0 for writing data associated with the boundary pixel of a collectively supervised pixel group in the data register 213 or when it receives a signal END indicative of the end of one line of operation, it delivers a read pulse RD to the page memory 160 so that memory data are read out and transferred to a temporary register 216 via an input/output buffer group 217. Subseqently, the timing generator 218 feeds a write pulse WR to the page memory 160 to write a plurality of pixels therein via the buffer group 217. At this instant, based on the output of the flag register 214, a data selecting gate 215 selects the data of the data register 213 for those bits where data have been written in the data register 213 and selects the data of the temporary register 216 for the other bits. When all such data have been written in the page memory 160, the flag register 214 is reset. The timing generator 218 switches over the input/output direction of the input/output buffer group 217 in conformity to the delivery of data to and from the page memory 160. As stated, the data once stored in the page memory 160 are read thereoutof and then rewritten. This is successful in preventing, when the start end coordinates Xs and Xe designated by the microcomputer 110 do not coincide with the boundary bit of a collectively supervised pixel group, the pixel data other than those designated by the microcomputer 110 from being rewritten. In this manner, the SP concerter 210 writes a plurality of pixel data in the page memory 160 at a time.

The rest of the construction and operation of this embodiment is the same as the previous embodiment, and redundant description will be avoided for simplicity.

The alternative embodiment having the above construction allows the size or arrangement of a matrix for artificial halftone processing to be changed in relation to an image output unit in which each plurality of pixels share a different address. Hence, halftone processing can be effected in an optimal fashion for a particular kind of figure.

In the embodiments shown and described, the tables of the address converters 170 and 180 and dither processing circuit 190 are implemented by read/write memories so that they may be rewritten by the software of the microcomputer 110. Alternatively, the address converters 170 and 180 and dither processing circuit 190 may each be provided with a plurality of tables, in which case the microcomputer 110 will select any of the tables matching the content of a figure.

The memory unit 192 and comparator 193 built in the dither processing circuit 190 in the illustrative embodiments may be constructed into a single unit. Specifically, if an arrangement is so made as to apply all the position information Sx on the threshold matrix and the density data DATA to the address terminal as parameters, there can be constructed a memory unit which directly outputs the threshold value and DATA.

In summary, it will be seen that the present invention provides an artificial halftone processing apparatus in which a matrix can be changed in size or arrangement to execute optimal halftone for a particular kind of figure. This insures high quality output images. Further, since a majority of processing is implemented by hardware, the processing time is extremely short. Even when use is made of an image output unit of the type assigning a single address to each plurality of pixels, high quality images are achievable because the size and arrangement of the matrix is variable and because a pluality of pixel data can be collectively stored in a memory.

Various modifications will become possible for those skilled in the art after receiving the teachings of the present disclosure without departing from the scope thereof.

What is claimed is:

1. An artificial halftone processing apparatus for processing and rendering a halftone image artificially, comprising:
   image outputting means having two-dimensional addresses being assigned to respective pixels which constitute a two-dimensional image;
   pulse generating means for generating pulses having a predetermined period;
   address generating means for generating the two-dimensional dimensional addresses of said image outputting means, said address generating means comprising at least one counter for counting the pulses generated by said pulse generating means;
   halftone processing means for outputting to said image outputting means a signal derived from a tone level of an input multi-level signal, the halftone processing means including a halftone processing table in which a different threshold value is assigned to each pixel position in a set two-dimensional pixel matrix region;
   address information converting means for converting two-dimensional address information generated by said address generating means into two-dimensional position information representative of a pixel position in said two-dimensional pixel matrix of said halftone processing means, and feeding said position information to said halftone processing means; and
   matrix updating means for updating an arrangement or a size of said two-dimensional pixel matrix region and updating a content of conversion by said address information converting means.

2. An apparatus as claimed in claim 1, wherein said halftone processing means comprises:
   a halftone processing table comprising a read/write memory; and
   memory rewriting means for rewriting a content of said read/write memory.

3. An apparatus as claimed in claim 1, wherein said address information converting means comprises:
   a read/write memory for storing the content of conversion; and
   memory rewriting means for rewriting a content of said read/write memory.

4. A method of generating a single image using the apparatus of claim 1, the image including a plurality of figures, the method comprising the steps of:
   (a) reading figure data for a current figure;
   (b) writing new current figure threshold values into the halftone processing table when no data is in the table or when different threshold values are in the table;
   (c) rendering a half-tone image of the current figure in the image outputting means using the apparatus; and
   (d) returning to step (a) if there are any remaining figures.

5. An artificial halftone processing apparatus for processing and rendering a halftone image artificially, comprising:
   image outputting means having addresses, each address being assigned to a plurality of pixels which constitute a two-dimensional image together with other pixels and which pixels have individual two-dimensional addresses;
   pulse generating means for generating pulses having a predetermined period;

address generating means for generating the two-dimensional addresses of said image outputting means by using at least one counter for counting the pulses generated by said pulse generating means;

serial-to-parallel converting means for storing, by using a register capable of holding a plurality of pixel data, input pixel data by switching positions in response to the two-dimensional addresses output by said address generating means, and outputting a plurality of pixel data to said image outputting means in parallel;

halftone processing means for outputting to said image outputting means a signal derived from a tone level of an input multi-level signal, the halftone processing means including a halftone processing table in which a different threshold value is assigned to each pixel position in a set two-dimensional pixel matrix region;

address information converting means for converting two-dimensional address information generated by said address generating means into two-dimensional position information representative of a pixel position in said two-dimensional pixel matrix of said halftone processing means, and feeding said position information to said halftone processing means; and matrix updating means for updating an arrangement or a size of said two-dimensional pixel matrix region and updating a content of conversion by said address information converting means.

6. An apparatus as claimed in claim 5, wherein said halftone processing means comprises:

a halftone processing table comprising a read/write memory; and memory rewriting means for rewriting a content of said read/write memory.

7. An apparatus as claimed in claim 5, wherein said address information converting means comprises:

a read/write memory for storing the content of conversion; and memory rewriting means for rewriting a content of said read/write memory.

8. A method of generating a single image using the apparatus of claim 5, the image including a plurality of figures, the method comprising the steps of:

(a) reading figure data for a current figure;

(b) writing new current figure threshold values into the halftone processing table when no data is in the table or when different threshold values are in the table;

(c) rendering a half-tone image of the current figure in the image outputting means using the apparatus; and (d) returning to step (a) if there are any remaining figures.

9. An artificial halftone processing apparatus for processing and rendering a halftone image artificially, the apparatus comprising:

(a) a microcomputer, the microcomputer including:
 (1) means for generating graphic data in response to input image data, by generating first address components respectively representative of a start point and an end point which are the boundaries of a figure along a first direction associated with the first address components;

(b) a page memory having two-dimensional addresses, the addresses being assigned to respective pixels which constitute a two-dimensional image;

(c) address generating means for generating the two-dimensional addresses of the image outputting means, the address generating means including:
 (1) storage means for storing the first address components of the start and end points from the microcomputer;
 (2) a pulse generating circuit for generating pulses;
 (3) a counter for counting the pulses from the pulse generating circuit, starting from the first address component of the start point;
 (4) a comparator for outputting a comparator result; and
 (5) means for outputting, on the basis of the comparator result, the first address components of the pixels, from the first address component of the start point to the first address component of the end point;

(d) halftone processing means for outputting to the page memory a signal derived from a tone level of an input multi-level signal, the halftone processing means including a halftone processing table in which a different threshold value is assigned to each pixel position in a two-dimensional pixel matrix region;

(e) address information converting means for converting two-dimensional address information generated by the address generating means into two-dimensional position information representative of a pixel position in the two-dimensional pixel matrix of the halftone processing means, and feeding the position information to the halftone processing means, the address information converting means including:
 (1) a first read/write memory for selectively receiving either
  (i) the first address component from the counter in the address generating means; or
  (ii) a first memory rewrite address signal from the microcomputer; and
 (2) a second read/write memory for selectively receiving either
  (i) the second address component; or
 (ii) a second memory rewrite address signal from the microcomputer; and (f) matrix updating means for updating an arrangement or a size of the two-dimensional pixel matrix region and updating a content of conversion by the address information converting means.

10. A method of generating a single image using the apparatus of claim 9, the image including a plurality of figures, the method comprising the steps of:

(a) reading figure data for a current figure;

(b) writing new current figure threshold values into the halftone processing table when no data is in the table or when different threshold values are in the table;

(c) rendering a half-tone image of the current figure in the image outputting means using the apparatus; and (d) returning to step (a) if there are any remaining figures.

11. The apparatus of claim 9, wherein:

(a) the microcomputer further includes:
 (1) means for outputting second address components along a first direction associated therewith;

(2) means for updating the second address components; and
(3) means for outputting the first address components respectively representative of the start point and the end point; and
(b) the address generating means further includes:
(1) means for writing both the first and second address components into the storage means; and
(2) means for outputting two-dimensional coordinates of the pixels from the start point to the end point.

12. An artificial halftone processing apparatus for processing and rendering a halftone image artificially, the apparatus comprising:
image outputting means having two-dimensional addresses assigned to respective pixels which constitute a two-dimensional image;
address generating means for generating the two-dimensional addresses of the image outputting means;
halftone processing means for outputting to the image outputting means a signal derived from a tone level of an input multi-level signal, the halftone processing means including a halftone processing table in which a different threshold value is assigned to each pixel position in a set two-dimensional pixel matrix region;
address information converting means for converting two-dimensional address information generated by the address generating means into two-dimensional position information representative of a pixel position in the two-dimensional pixel matrix of the halftone processing means, and feeding the position information to the halftone processing means; and
matrix updating means for updating an arrangement or a size of the two-dimensional pixel matrix region and updating a content of conversion by the address information converting means.

13. A method of generating a single image using the apparatus of claim 12, the image including a plurality of figures, the method comprising the steps of:
(a) reading figure data for a current figure;
(b) writing new current figure threshold values into the halftone processing table when no data is in the table or when different threshold values are in the table;
(c) rendering a half-tone image of the current figure in the image outputting means using the apparatus; and
(d) returning to step (a) if there are any remaining figures.

14. An artificial halftone processing apparatus for processing and rendering a halftone image artificially, comprising:
(a) a microcomputer, the microcomputer including:
(1) means for generating graphic data in response to input image data, by generating first address components respectively representative of a start point and an end point which are the boundaries of a figure along a first direction associated with the first address components;
(b) page memory having addresses, each address being assigned to a plurality of pixels which constitute a two-dimensional image together with other pixels and which pixels have individual two-dimensional addresses;
(c) pulse generating means for generating pulses having a predetermined period;
(d) address generating means for generating the two-dimensional addresses of said page memory by using at least one counter for counting the pulses generated by said pulse generating means, the address generating means including:
(1) storage means for storing the first address components of the start and end points from the microcomputer;
(2) a pulse generating circuit for generating pulses;
(3) a counter for counting the pulses from the pulse generating circuit, starting from the first address component of the start point;
(4) a comparator for outputting a comparator result; and
(5) means for outputting, on the basis of the comparator result, the first address components of the pixels, from the first address component of the start point to the first address component of the end point;
(e) serial-to-parallel converting means for storing, by using a register capable of holding a plurality of pixel data, input pixel data by switching positions in response to the two-dimensional addresses output by said address generating means, and outputting a plurality of pixel data to said page memory in parallel;
(f) halftone processing means for outputting to said page memory a signal derived from a tone level of an input multi-level signal, the halftone processing means including a halftone processing table in which a different threshold value is assigned to each pixel position in a set two-dimensional pixel matrix region;
(g) address information converting means for converting two-dimensional address information generated by said address generating means into two-dimensional position information representative of a pixel position in said two-dimensional pixel matrix of said halftone processing means, and feeding said position information to said halftone processing means, the address information converting means including:
(1) a first read/write memory for selectively receiving either
(i) the first address component from the counter in the address generating means; or
(ii) a first memory rewrite address signal from the microcomputer; and
(2) a second read/write memory for selectively receiving either
(i) the second address component; or
(ii) a second memory rewrite address signal from the microcomputer; and
(h) matrix updating means for updating an arrangement or a size of said two-dimensional pixel matrix region and updating a content of conversion by said address information converting means.

15. A method of generating a single image using the apparatus of claim 14, the image including a plurality of figures, the method comprising the steps of:
(a) reading figure data for a current figure;
(b) writing new current figure threshold values into the halftone processing table when no data is in the table or when different threshold vlaues are in the table;
(c) rendering a half-tone image of the current figure in the image outputting means using the apparatus; and (d) returning to step (a) if there are any remaining figures.

16. The apparatus of claim 14, wherein:
(a) the microcomputer further includes:
   (1) means for outputting second address components along a first direction associated therewith;
   (2) means for updating the second address components; and
   (3) means for outputting the first address components respectively representative of the start point and the end point; and
(b) the address generating means further includes:
   (1) means for writing both the first and second address components into the storage means; and
   (2) means for outputting two-dimensional coordinates of the pixels from the start point to the end point.

17. An artificial halftone processing apparatus for processing and rendering a halftone image artificially, comprising:
   image outputting means having addresses, each address being assigned to a plurality of pixels which constitute a two-dimensional image together with other pixels and which pixels have individual two-dimensional addresses;
   address generating means for generating the two-dimensional addresses of said image outputting means;
   serial-to-parallel converting means for storing, by using a register capable of holding a plurality of pixel data, input pixel data by switching positions in response to the two-dimensional addresses output by said address generating means, and outputting a plurality of pixel data to said image outputting means in parallel;
   halftone processing means for outputting to said image outputting means a signal derived from a tone level of an input multi-level signal, the halftone processing means including a halftone processing table in which a different threshold value is assigned to each pixel position in a set two-dimensional pixel matrix region;
   address information converting means for converting two-dimensional address information generated by said address generating means into two-dimensional position information representative of a pixel position in a said two-dimensional pixel matrix of said halftone processing means, and feeding said position information to said halftone processing means; and
   matrix updating means for updating an arrangement or a size of said two-dimensional pixel matrix region and updating a content of conversion by said address information converting means.

18. A method of generating a single image using the apparatus of claim 17, the image including a plurality of figures, the method comprising the steps of:
   (a) reading figure data for a current figure;
   (b) writing new current figure threshold values into the halftone processing table when no data is in the table or when different threshold values are in the table;
   (c) rendering a half-tone image of the current figure in the image outputting means using the apparatus; and
   (d) returning to step (a) if there are any remaining figures.

* * * * *